(12) United States Patent
Bond et al.

(10) Patent No.: US 6,173,167 B1
(45) Date of Patent: Jan. 9, 2001

(54) ADAPTIVE PROCESSOR INTEGRATOR FOR INTERFERENCE SUPPRESSION

(75) Inventors: James W. Bond; Thomas W. Schlosser, both of San Diego, CA (US); William Velez, Tucson, AZ (US)

(73) Assignee: The United States of America as represented by the Secretary of the Navy, Washington, DC (US)

( * ) Notice: Under 35 U.S.C. 154(b), the term of this patent shall be extended for 0 days.

(21) Appl. No.: 09/085,491

(22) Filed: May 27, 1998

(51) Int. Cl.[7] .................................................. H04Q 7/20
(52) U.S. Cl. ................................................................ 455/307
(58) Field of Search .............................. 455/307, 296, 455/63; 375/285, 200; 702/194

(56) References Cited

U.S. PATENT DOCUMENTS

| | | |
|---|---|---|
| 4,438,530 | 3/1984 | Steinberger . |
| 4,583,048 | 4/1986 | Gumacos et al. . |
| 4,591,857 | 5/1986 | Thor . |
| 4,720,712 | 1/1988 | Brookner et al. . |
| 4,931,977 | 6/1990 | Klemes . |
| 5,018,088 * | 5/1991 | Higbie .................... 364/574 |
| 5,117,232 | 5/1992 | Cantwell . |
| 5,272,663 | 12/1993 | Jones et al. . |
| 5,396,657 * | 3/1995 | Jokinen .................... 455/307 |
| 5,432,725 * | 7/1995 | Bond ...................... 364/724.19 |
| 5,493,717 * | 2/1996 | Schwarz ................... 455/307 |
| 5,509,032 * | 4/1996 | Bond ....................... 455/63 |
| 5,544,199 * | 8/1996 | Bond ....................... 375/285 |

* cited by examiner

Primary Examiner—Daniel S. Hunter
Assistant Examiner—Myron K. Wyche
(74) Attorney, Agent, or Firm—Harvey Fendelman; Michael A. Kagan; Peter A. Lipovsky

(57) ABSTRACT

Processors which process baseband received signal sample amplitudes and ones which process baseband received sample phases are combined in a single general processor which cancels a greater variety of interference than any of the individual processors incorporated into it. This processor combines a wide-range of processors, for example, processors which filter baseband in-phase/quadrature sample amplitudes and phases. This general processor performs against any interferer as well as, or better than, the best of the processors it includes. The general processor assesses individual processor outputs and weights these so that those processors with the best interference suppressed outputs are utilized to form an interference suppressed output.

10 Claims, 14 Drawing Sheets

| FIG. 2A | FIG. 2B |

ADAPTIVE PROCESSOR INTEGRATOR FOR INTERFERENCE SUPPRESSION

INCORPORATION BY REFERENCE

The following commonly owned U.S. Patents are hereby incorporated by reference into this specification:

KERNEL ADAPTIVE INTERFERENCE SUPPRESSION SYSTEM, U.S. Pat. No. 5,517,531; by J. W. Bond, D. J. Marchette, C. E. Priebe, and T. W. Schlosser;

TWO-DIMENSIONAL KERNEL ADAPTIVE INTERFERENCE SUPPRESSION SYSTEM, U.S. Pat. No. 5,499,399; by J. W. Bond, D. J. Marchette, C. E. Priebe, and T. W. Schlosser;

NON-ADAPTIVE AMPLITUDE-DIFFERENCE INTERFERENCE FILTER, U.S. Pat. No. 5,544,199; by J. W. Bond; NON-ADAPTIVE PHASE-DIFFERENCE INTERFERENCE FILTER, U.S. Pat. No. 5,509,032; by J. W. Bond;

METHOD AND APPARATUS FOR SUPPRESSING INTERFERENCE FROM BANDSPREAD COMMUNICATION SIGNALS, U.S. Pat. No. 5,495,497; by J. W. Bond, T. W. Schlosser, and W. Velez; and METHOD AND APPARATUS FOR SUPPRESSING LINEAR AMPLITUDE INTERFERENCE FROM BANDSPREAD COMMUNICATION SIGNALS, U.S. Pat. No. 5,495,496; by J. W. Bond and W. Velez.

BACKGROUND OF INVENTION

1. Field of the Invention

This invention relates generally to the suppression of interference amongst communication signals. In greater particularity, the invention relates to an interference suppression processor, which itself includes multiple processors, which performs against any interferer as well as, or better than, the best of the processors it includes.

2. Description of Related Art

Major sources of radio interference are non-Gaussian in structure. A variety of processors have been developed to cancel different types of non-Gaussian interference. Among these processors are ones which process baseband received signal sample amplitudes and ones which process baseband received signal sample phases. These processors have been developed/optimized to best cancel specific kinds of interference.

Processors of amplitudes and processors of phase best cancel specific kinds of interference. As a result, no single processor performs best for all kinds of interferers. There is thus a need for a single processor that can cancel a wide range of interference as well as any individual processor cancels specific kinds of interference.

SUMMARY OF THE INVENTION

Processors which process baseband received signal sample amplitudes and ones which process baseband received sample phases are combined in a single processor which cancels a greater variety of interference than any of the individual processors incorporated into it.

The invention to be described can be used to combine a wide-range of processors, for example, processors which filter baseband in-phase/quadrature sample amplitudes and phases. This invention is a general processor, which itself includes multiple processors, which performs against any interferer as well as, or better than, the best of the processors it includes. The invention assesses the individual processor outputs and weights these so that those processors with the best interference suppressed outputs are utilized to form the interference suppressed output of the invention. The remaining individual processors are inactivated so that their outputs do not contribute to the output of the invention.

OBJECTS OF THE INVENTION

It is an object of this invention to provide an improved interference suppression processor.

Another object of this invention is to provide an interference suppression processor that is capable of performing against a wide range of interferers.

Other objects, advantages and new features of this invention will become apparent from the following detailed description of the invention when considered in conjunction with the accompanying drawings.

DESCRIPTION OF THE PREFERRED EMBODIMENT

Figure 1:
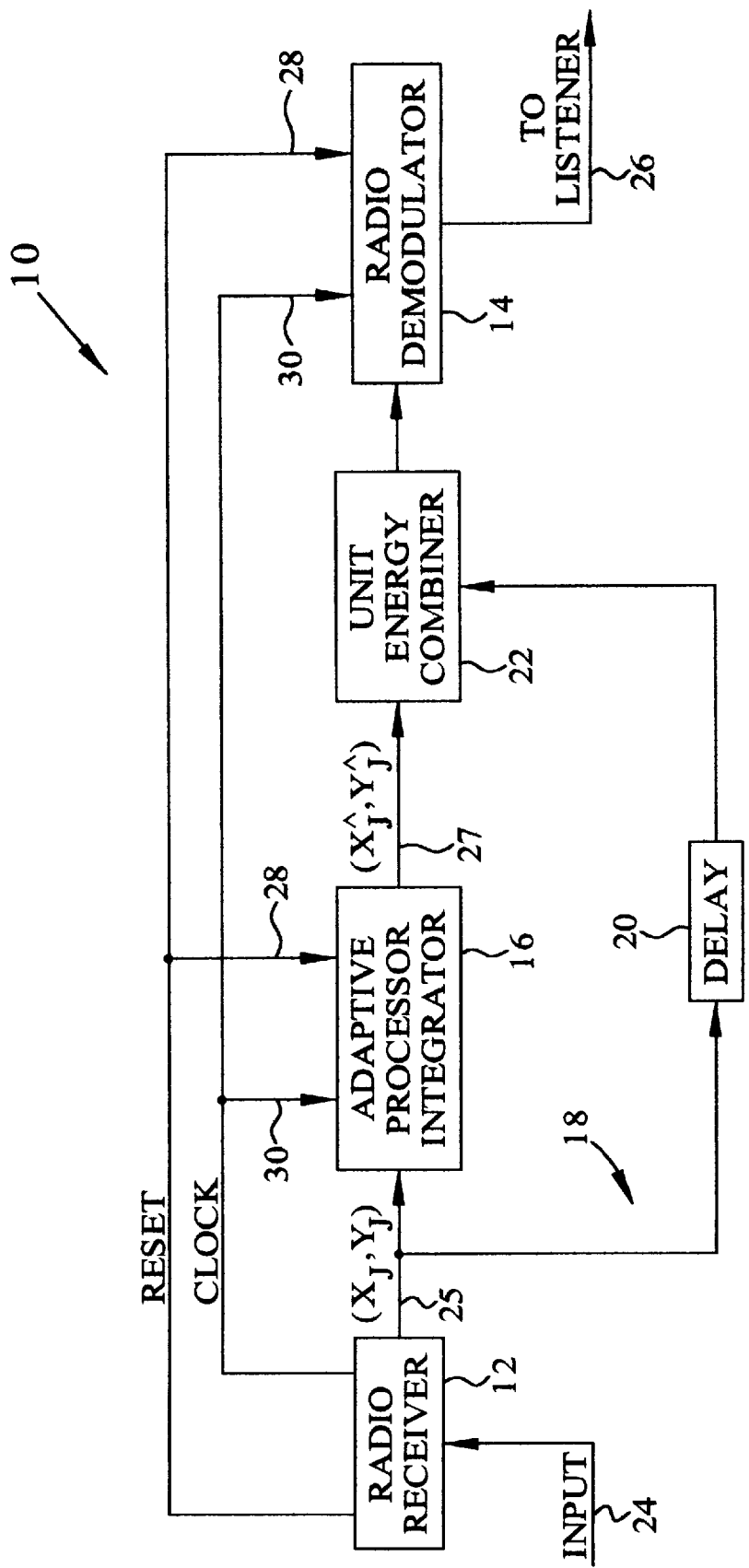
FIG. 1 is a block diagram of an interference suppression system incorporating the invention.

In FIG. 1 there is shown an interference system 10. System 10 includes components of a typical radio including a receiver 12 and a demodulator 14. As a stand-alone processor, an adaptive processor integrator 16 according to the invention is inserted between receiver 12 and modulator 14 as shown. Demodulator 14 includes a delay, not shown, to account for the total processing delay caused by the invention, in order to despread a received signal.

A preferred embodiment of the invention is designed for the reception of bandspread signals having each information bit spread by a factor of 10 or more, however, other spread factors may be used. Use of the invention with a radio requires that the radio have a bypass of processor 16 for reception of communication signals which are not bandspread. This bypass, not shown, may be constructed according to conventional techniques.

To provide satisfactory performance in cases where the signal of interest dominates the background rather than being obscured by interference, adaptive processor integrator 16 should be used in conjunction with a bleed-through path 18. This path includes a delay 20 that equals the delay through processor 16. Signals delayed through bleed-through path 18 and those output from processor 16 are normalized and combined conventionally in combiner 22.

Receiver 12 converts input signals 24 into a sequence of in-phase and quadrature samples, $x_j$ and $y_j$, respectively (j being an arbitrary index). Sample pair $(x_j, y_j)$, shown as element number 25 in FIG. 1, is a complex sample of the received signal for index j and can be viewed as a vector with x-component $x_j$ and y-component $y_j$. According to this description, signals $x_j$ and $y_j$ are the centermost pair of a representative number (2N+1) or sequence of received signals samples taken: $(x_{j-N}, y_{j-N}) \ldots (x_j, y_j) \ldots (x_{j+N}, y_{j+N})$.

The invention described is designed to work at the chip sample rate or twice the chip sample rate. The preferred sample rate is twice that of the chip used to spread the communication signal bit. Those skilled in the art will realize that the invention could be modified to work at even higher sample rates. At higher sample rates, it would be necessary to process streams of sample data in parallel, with each stream including data samples one-half a chip apart.

Referring again to FIG. 1, the processed output 27 of processor 16 is a sequence of transformed in-phase and quadrature samples $(x_j\hat{}, y_j\hat{})$. This output should be combined with the sampled input signals 25 so that the invention does not cause loss of reception when there is little interference. This can be accomplished via bleed-through path 18. A reset signal 28 and a clock signal 30, from radio 12, are used in integrator 16 to synchronize its operation with radio receiver 12 and demodulator 14.

The adaptive processor integrator of the invention preferably includes a wide variety of processors which suppress interference, such as those that filter amplitude, see for example, U.S. Pat. No. 5,517,531, amplitude-difference, see for example, U.S. Pat. No. 5,544,199, symmetric amplitude-difference, see for example, U.S. Pat. No. 5,495,496, phase, see for example, U.S. Pat. No. 5,495,496, phase-difference, see for example, U.S. Pat. No. 5,509,032, and symmetric phase-difference, see for example, U.S. Pat. No. 5,499,399.

The quantities used in the invention are as follows:

A. the quantity $A_j$, where $A_j^2 = x_j^2 + y_j^2$ and $A_j \geq 0$, is called the amplitude of the sample j;

B. the quantity of $\phi_j$, where $x_j + iy_j = A_j e^{i\phi}j$, is called the phase of the sample j;

C. the quantity $\delta(A)_j = A_j - A_{j-1}$ is called an amplitude difference;

D. the quantity $\delta_s(A)_j = A_j - (\frac{1}{2})(A_{j-1} + A_{j+1})$ is called a symmetric amplitude-difference;

E. the quantity $\delta(\phi_j) = \phi_j - \phi_{j-1}$ is called a phase difference; and F. the quantity $\delta(\phi_j) = \phi_j - (\frac{1}{2})(\phi_{j-1} + \phi_{j+1})$ is called a symmetric phase-difference.

Processors which filter amplitude, amplitude-differences, and symmetric amplitude-differences are known as amplitude processors. Those processors which filter phase, phase-differences, and symmetric phase-differences are known as phase processors. The invention includes a total of M processors with at least one amplitude processor and at least one phase processor (M being a positive integer).

Figures 2, 2A:
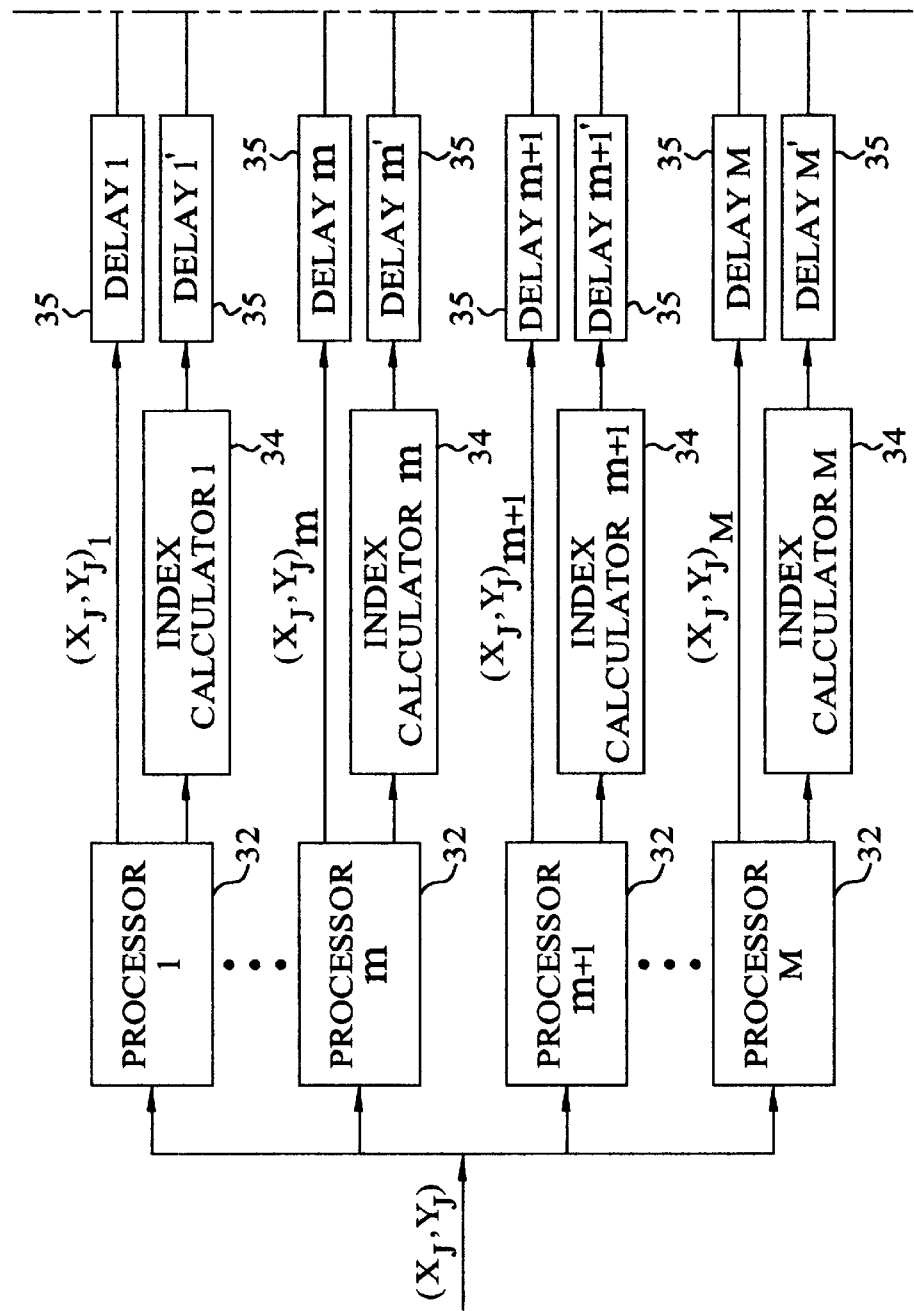
FIG. 2 shows a representative implementation of an adaptive processor integrator according to the invention.
Figure 2B:
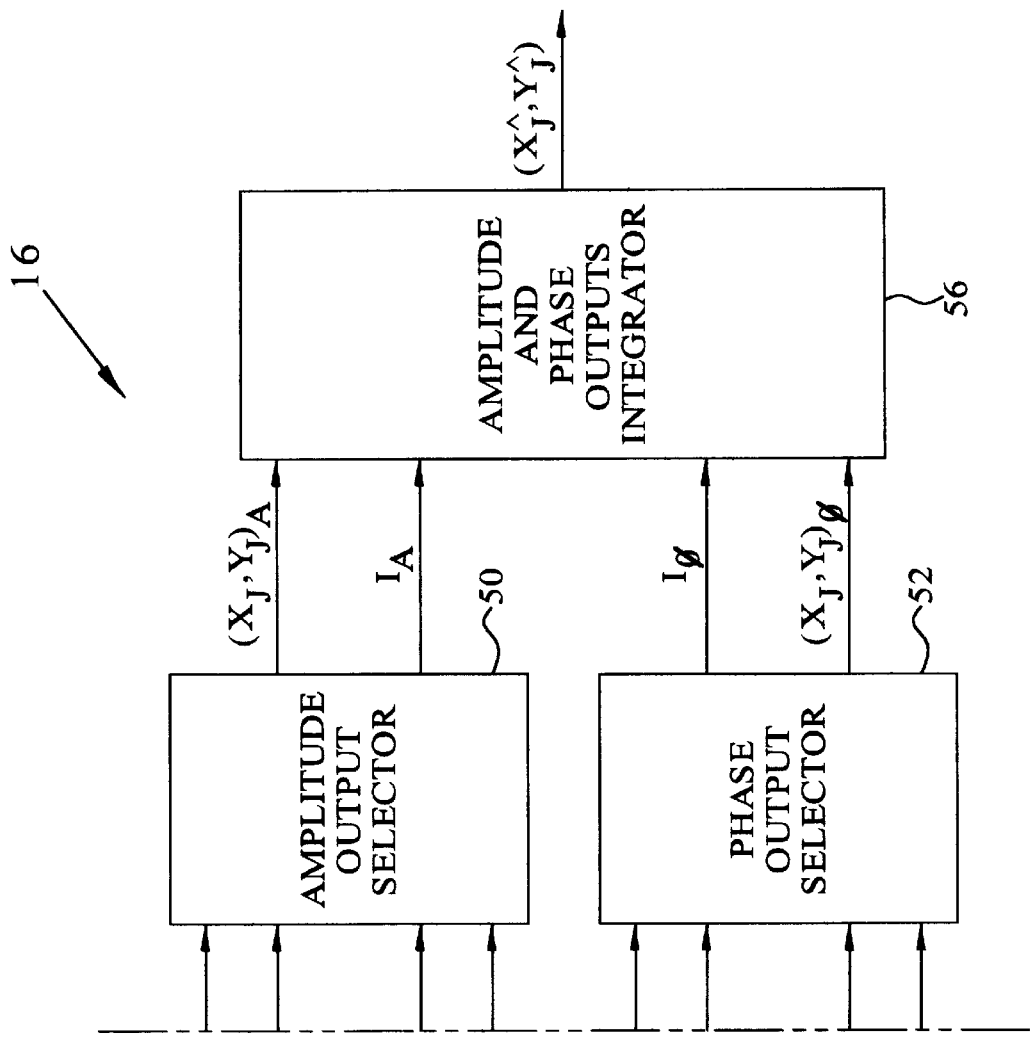

Referring now to FIG. 2, adaptive processor integrator 16 according to one embodiment of the invention is shown. This embodiment of the invention utilizes at least one processor of amplitude and at least one processor of phase. In FIG. 2, the invention is shown with what will typically be multiple processors 32 of amplitude, identified as processors 1 . . . m and multiple processors 32 of phase, identified as processors m+1 . . . M (m and M being positive integers). The total of M processors provide amplitude $A_j$ to their corresponding M index calculators 34, the operation of which will be described. Alternatively, $A_j$ from Processor 1 alone could be used by all of the M index calculators via a path not shown. The M processors 32 provide the following outputs: the transformed in-phase/quadrature pair denoted by $(x_j, y_j)_k$ for the k-th processor; an overall gain factor $g_k(j)$ for the k-th processor; a signal gain factor $h_k(j)$ for the k-th processor; and a sample-to-sample weighing factor $c_k(j)$ for the k-th processor, k=1, 2, . . . , M.

The overall gain factor $g_k(j)$ is defined in terms of $(x_j, y_j)_k$, $(x_j, y_j)$ and $A_j$. For amplitude processors, gain factor $g_k(j)$ takes the form of $(x_j, y_j)_k = g_k(j)(x_j/A_j, y_j/A_j)$. For phase processors, gain factor $g_k(j)$ takes the form of $(x_j, y_j)_k = g_k(j)(-y_j, x_j)$.

The signal gain factor $h_k(j)$ is a gain factor inherent to a particular processor. For amplitude processors, signal gain factor $h_k(j)$ will take the form of the vector $(x_j, y_j)_k = h_k(j)s_{p,j}$+other non-interferer/non-communication terms, where $s_{p,j}$ is the projection of the signal onto the interferer and for phase processors, signal gain factor $h_k(j)$ will take the form of the vector $(x_j, y_j)_k = h_k(j)s_{n,j}$+other non-interference/non-communication terms, where $s_{n,j}$ is the projection of the signal onto the interferer rotated counterclockwise by 90°. For processors in which $h_k(j)$ is not explicitly available, it suffices to provide the relative weighting of the outputs $(x_j, y_j)_k$ from sample to sample.

The choice of the sample-to-sample weighing constant $c_k(j)$ for various specific processors can be made, for example, according to the following guidelines. Exemplary normalization constants $c_k(j)$ can be chosen as follows:

$$c_k(j) = 1/(2N) \text{ if } g(A_j) = \sum_{k=-N}^{N} (A_j - A_k) \text{ or} \quad (1)$$

$$g(\phi_j) = \sum_{k=-N}^{N} (\phi_j - \phi_k)$$

$$c_k(j) = 1/(2N-1) \text{ if } g(\delta(A_j)) = \sum_{k=-N}^{N} (\delta(A_j) - \delta(A_k)) \text{ or} \quad (2)$$

$$g(\delta(\phi_j)) = \sum_{k=-N}^{N} (\delta(\phi_j) - \delta(\phi_k))$$

In which there are 2N+1 complex samples with $\delta(A_j) = A_j - (\frac{1}{2})(A_{j-1} + A_{j+1})$ and $\delta(\phi_j) = \phi_j - (\frac{1}{2})(\phi_{j-1} + \phi_{j+1})$.

The normalization constants have been chosen so that for all of the processors, $c_k(j)g_k(j) = S_{pj}$+unwanted terms, for an amplitude processor and $c_k(j)g_k(j) = S_{nj}$+unwanted terms, for a phase processor.

The over-all gain factors $g_k(j)$, the signal gain factors $h_k(j)$, and the sample-to-sample weighing factors $c_k(j)$ are input to corresponding index calculators k, for k=1, 2, . . . , M. The M index calculators are shown as elements 34 in FIG. 2 and are shown in more detail in FIG. 3. Index calculators 34 are used to ascertain the performance of a particular processor in combating interference. Under the convention used in the exemplary embodiment described here, the lower the index calculated by an index processor, the greater is the performance of the interference processor corresponding to the index calculator.

Figure 3:
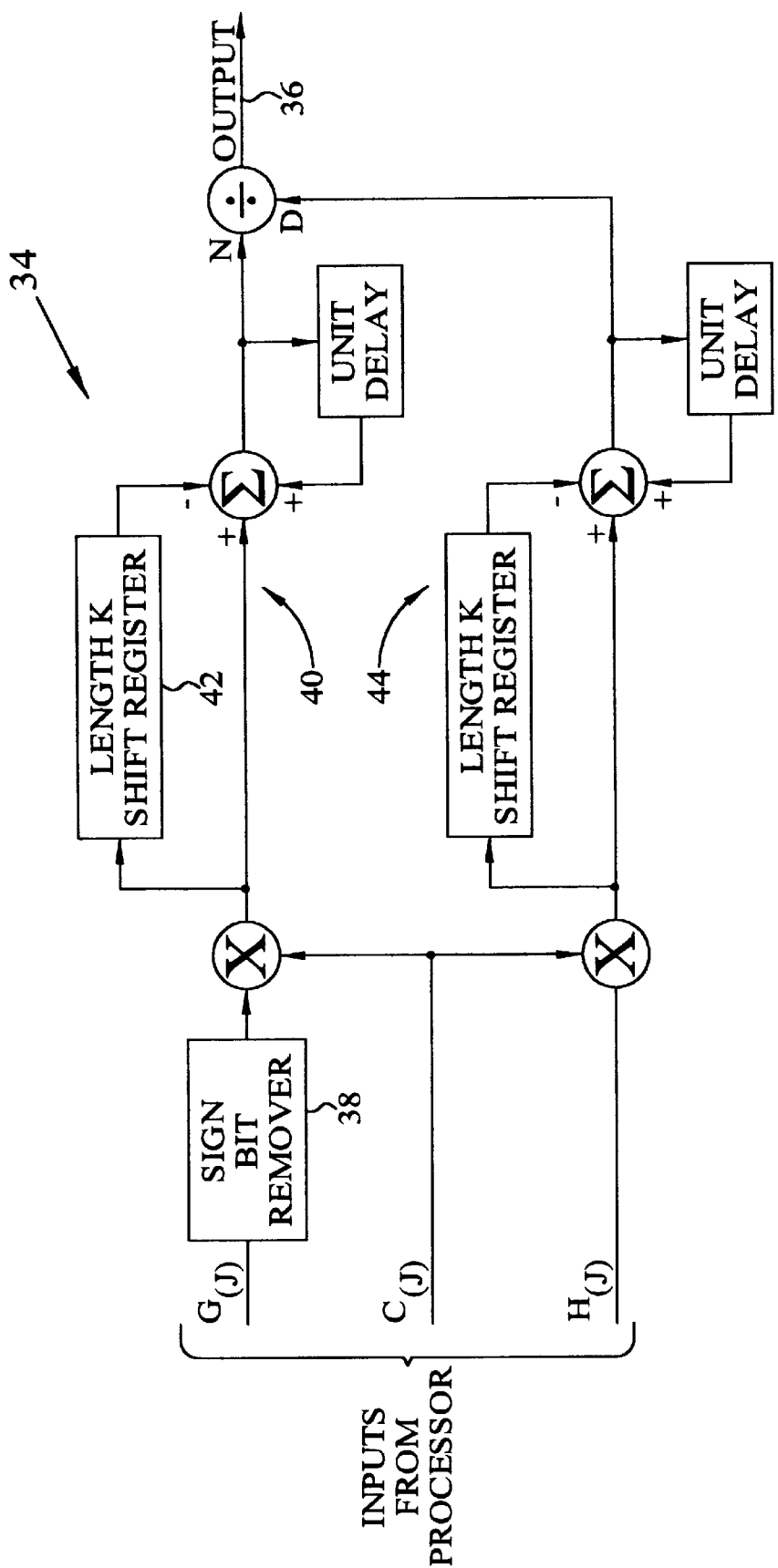
FIG. 3 is a block diagram of an index calculator such as may be used in a representative embodiment of the invention.

Referring now to FIG. 3, an exemplary index calculator 34 as may be utilized in the invention is illustrated. The quantity $h_k(j)$ as utilized in the invention may be constant for processor k, in which case this constant value could be generated within its corresponding index calculator k. Likewise quantity $c_k(j)$ may be constant for a processor k, in which case its constant value could be generated within its corresponding index calculator k. In particular the quantity $c_k(j)$ could be a constant to adjust the relative weight assigned to the jth output of a processor. Also, if $h_k(j)$ is used to provide the relative weighing, $c_k(j)$ can be taken as a constant c whose value is established experimentally. Alternately, $c_k(j)$ can be made proportional to $1/A_j^2$ to weight differently successive outputs of the same processor or $c_k(j)$ can be made proportional to $1/\delta(j)^2$ where $\delta(j)$ is the variance of the samples being filtered by the processor.

Referring once again to FIG. 3, output 36 ($I_k$) of the index calculator k is obtained in the following way. Input $g_k(j)$ is processed by a sign bit remover 38 which removes the sign bit to generate $|g_k(j)|$. The output of sign bit remover 38 is multiplied by $c_k(j)$ and is passed to block averager 40 to calculate a block average of $c_k(j)|g_k(j)|$. Shift register 42 determines the length K of the block. As can be seen, the quantities $c_k(j)h_k(j)$ are also added over the block using block averager 44, a copy of averager 40, to average $c_k(j)|g_k(j)|$. Calculating block averages as is done in block averagers 40 and 44 are known to those skilled in the art.

The output of index calculator k is $$I_k(j) = \left(\sum_{n=0}^{K-1} c_k(j-n)|g_k(j-n)|\right) / \left(\sum_{n=0}^{K-1} h_k(j-n)c_k(j-n)\right).$$

According to the exemplary embodiment of the invention described here, the lower the value of the index $I_k(j)$, the better the expected cancellation of the interference by the k-th processor.

The block averagers 40 and 44 for each of the M Index calculators should use the same integer K. The integer K is preferably chosen to be at least 10.

Referring again to FIG. 2, regarding the amplitude processing of the invention, it can be seen that the processor outputs $(x_j,y_j)_k$ for k=1, . . . , m and the corresponding indices of these processors as calculated in index calculators 34, are appropriately delayed via delays 35 and are input to an amplitude output selector 50 designed to select the one output $(x_j,y_j)_A$ from among its inputs $(x_j,y_j)_k$, likely to contain the least interference. In regard to the phase processing of the invention, the processor outputs $(x_j,y_j)_k$ for k=m+1, . . . , M and the corresponding indices of these processors as calculated in index calculators 34, are appropriately delayed via delays 35 and are input to a phase output selector 52 designed to select the one output $(x_j,y_j)_\phi$, from among its inputs $(x_j,y_j)_k$, likely to contain the least interference.

Figure 4A:
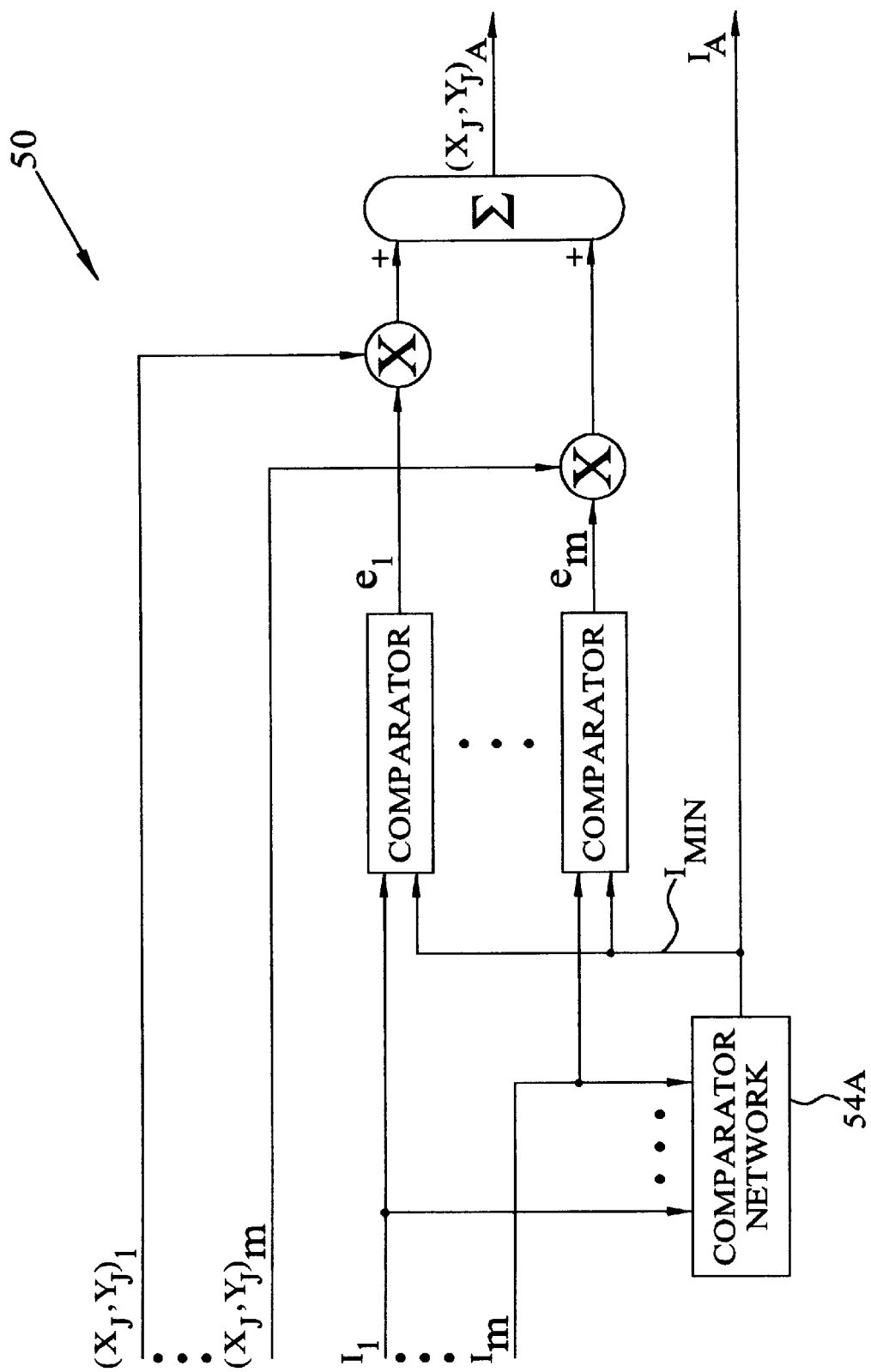
FIG. 4A is a block diagram of an amplitude output selector as may be used in the invention and FIG. 4B is a block diagram of a phase output selector as may be used in the invention.
Figure 4B:
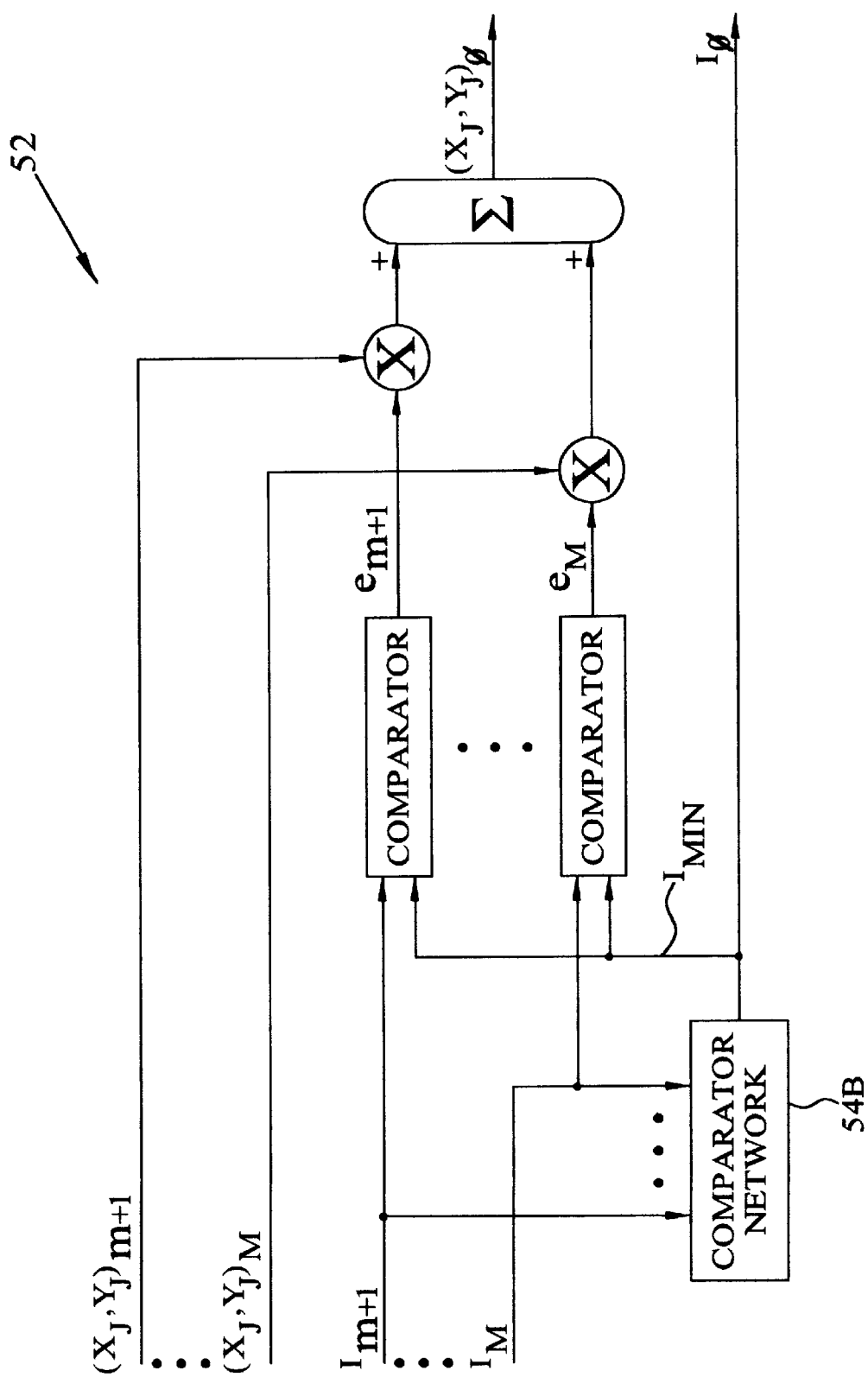

Output selectors that then can be used as amplitude output selector 50 or phase output selector 52 are illustrated in FIGS. 4A and 4B. respectively. The selections of processor outputs $(x_j,y_j)_A$ and $(x_j,y_j)_\phi$ are based on the indexes $I_k$, k=1, . . . , m and $I_k$, k=m+1, . . . , M, respectively. The index of a processor is an indicator of the performance of that particular processor in suppressing interference, so that the lower the value of the index, the greater the performance of the individual processor. For each output selector, in the case that more than one processor has the same minimal index value $I_{min}$, the output selector is designed to allow for the averaging of all outputs $(x_j,y_j)_k$ that have $I_k=I_{min}$.

The design of the invention allows for the input chosen for output from the amplitude output selector and the phase output selector to change from sample-to-sample.

In FIG. 4A, an exemplary amplitude output selector 50 is shown and in FIG. 4B an exemplary phase output selector 52 is shown. Referring to both of these figures, a comparator network 54A is used to identify the minimum of the indexes $I_1$, . . . , $I_m$ for amplitudes and a comparator network 54B is used to identify the minimum of the indexes $I_{m+1}$ . . . , $I_M$ for phases. In both output selectors, each index $I_k$(k=1 . . . M) is then compared with $I_{min}$ which generates the output $e_k$=1 if $I_k=I_{min}$ and a 0, otherwise. In FIG. 4A, output $I_A=I_{min}$ for the amplitude indexes and in FIG. 4B, output $I_\phi=I_{min}$ for the phase indexes.

Figure 5:
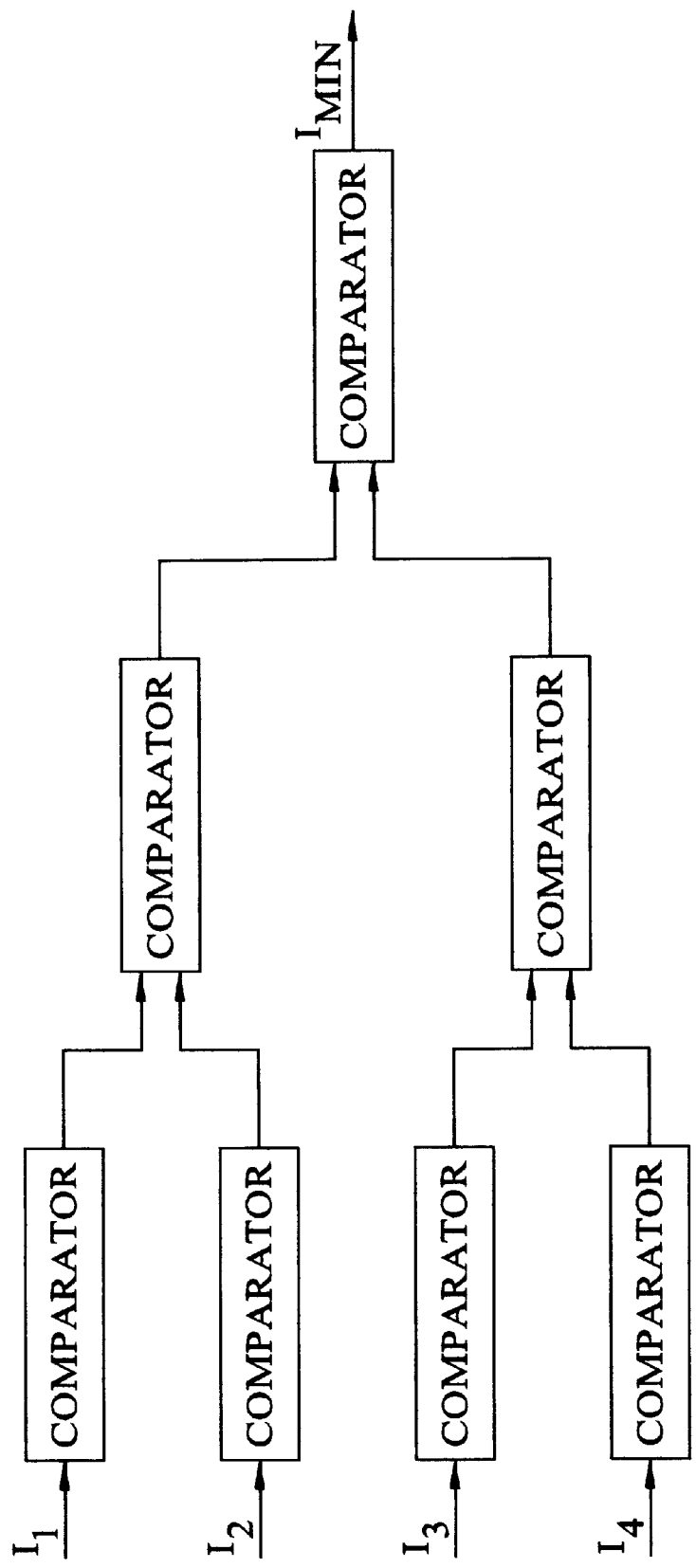
FIG. 5 is a block diagram of an exemplary gain selector comparator network as may be used in the invention.
Figure 6:
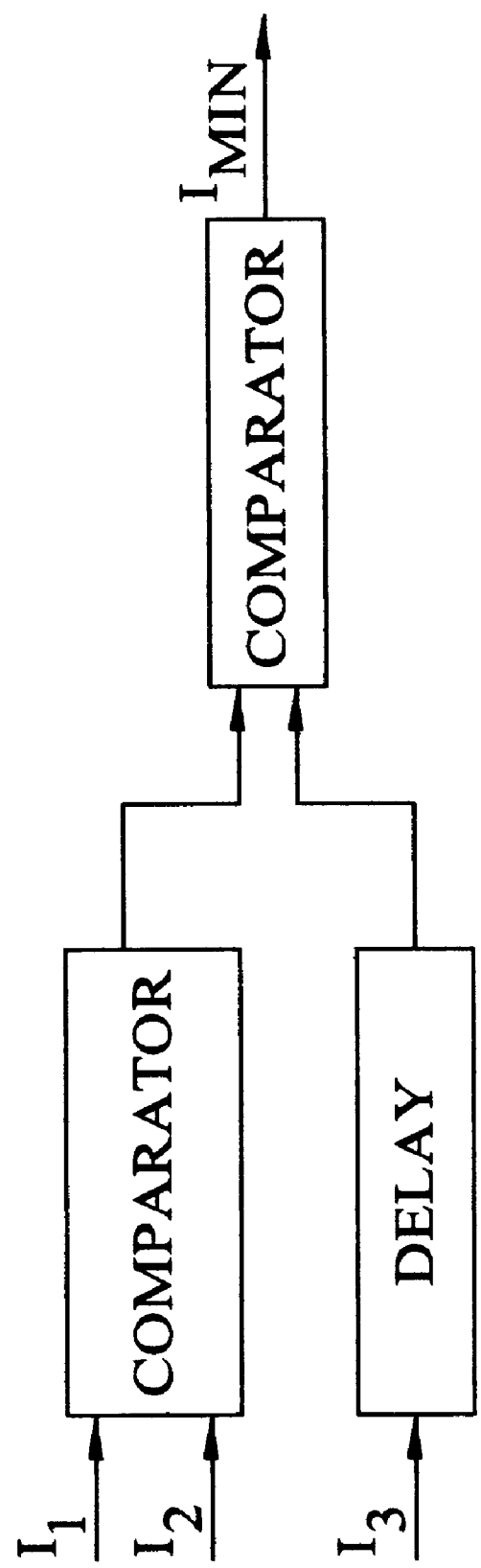
FIG. 6 is another exemplary gain selector comparator network as may be used in the invention.

Referring now to FIGS. 5 and 6, examples of comparator networks such as may be used for comparator network 54A and 54B of FIGS. 4A and 4, respectively, are shown. The comparator shown in FIG. 5 determines the minimum index of 4 inputs, while that shown in FIG. 6 determines the minimum index of 3 inputs. Of course the minimum of 2 inputs could be determined using a single comparator, while for 8 inputs, there would be 8 comparators in a first column, 4 comparators in a second column, 2 comparators in a third column, and 1 comparator in the fourth and final column, for a total of 15 comparators. This structure can be generalized to handle $2^n$ inputs, for n a positive integer. To handle a number of inputs which is not a power of 2, some of the comparators are replaced by delays. FIG. 6 provides an example for 3 inputs utilizing such a delay. The delay shown in FIG. 6 is equal to the processing delay through the left-side of the comparator.

Referring again to FIGS. 4A and 4B, the input $(x_j,y_j)_k$ to an output selector (50 or 52) is multiplied by $e_k$ and the results are summed over the indexes input to the output selector. The $e_k$ are also summed over the indexes of the inputs to the Output Selector. The output $(x_j,y_j)_A$ of amplitude output selector 50 and the output $(x_j,y_j)_\phi$ of phase output selector 52 are obtained by dividing $\Sigma e_k(x_j,y_j)_k$ by $\Sigma e_k$ where the sums are over the indexes of the inputs to the Output Selectors.

Referring once again to FIG. 2 it can be seen that the selected amplitude output $(x_j,y_j)_A$ and amplitude index $I_A$ of amplitude output selector 50 as well as the selected phase output $(x_j,y_j)_\phi$ and phase index $I_Q$ of phase output selector 52 are input into amplitude and phase outputs integrator 56.

Figure 7:
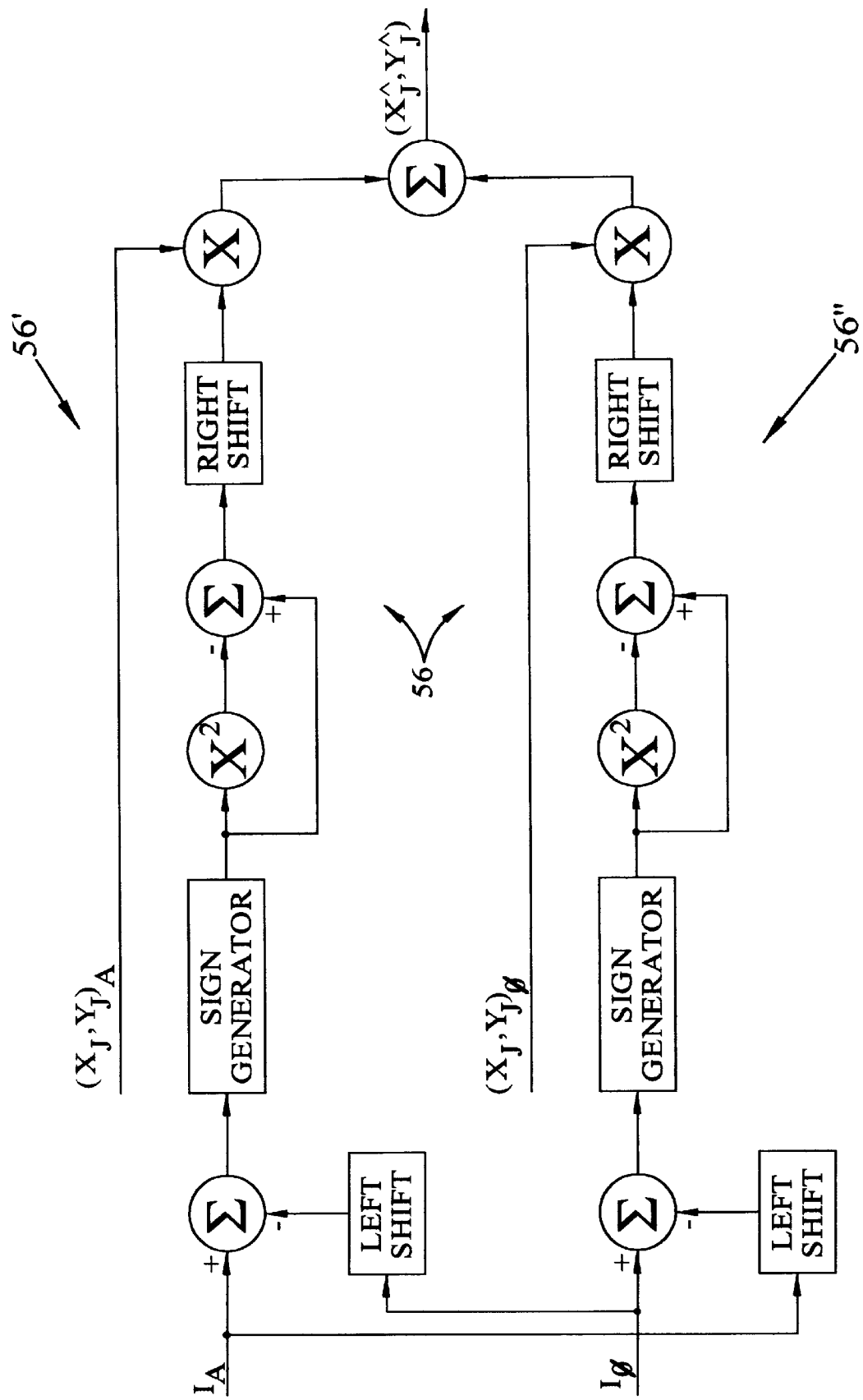
FIG. 7 is an amplitude and phase outputs integrator as may be used in a representative embodiment of the invention.

Referring now to FIG. 7, amplitude and phase outputs integrator 56 forms a weighted sum $(x_j\hat{},y_j\hat{})$ of $(x_j,y_j)_A$ and $(x_j,y_j)_\phi$ with weights a function of $I_A$ and $I_\phi$. The quantity $(x_j\hat{},y_j\hat{})$ is the output of the adaptive processor integrator of the invention. Integrator 56 is structured to form $$(x_j\hat{},y_j\hat{})=e(x_j,y_j)_A+f(x_j,y_j)_\phi,$$

where e=0,1; f=0,1; and e+f=1,2. Integrator 56 adds the two processor outputs $(x_j,y_j)_A$ and $(x_j,y_j)_\phi$ if their indexes $I_A$ and $I_\phi$ differ by less than a factor of 2, otherwise it outputs the processor output with minimal index. The top row 56' of components shown in FIG. 7 is structured to form $$((e_A^2-e_A)/2)\ (x_j,y_j)_A \text{ where}$$

$$e_A=\text{sign}\ [I_A-2I_\phi].$$

The bottom row 56" of components shown in FIG. 7 is structured to form $$((e_\phi^2 - e_\phi)/2) \, ((x_j, y_j)_\phi \text{ where}$$

$$e_\phi = \text{sign} \, [I_\phi - 2I_A].$$

Note that the quantity $e = (e_A^2 - e_A)/2$ is 1 when $I_A$ is less than twice $I_\phi$ and is zero when these indexes differ by more than a factor 2. Likewise $f = (e_\phi^2 - e_\phi)/2$ is 1 when $I_\phi$ is less than twice $I_A$ and zero when the indexes differ by more than a factor of 2.

Figure 8:
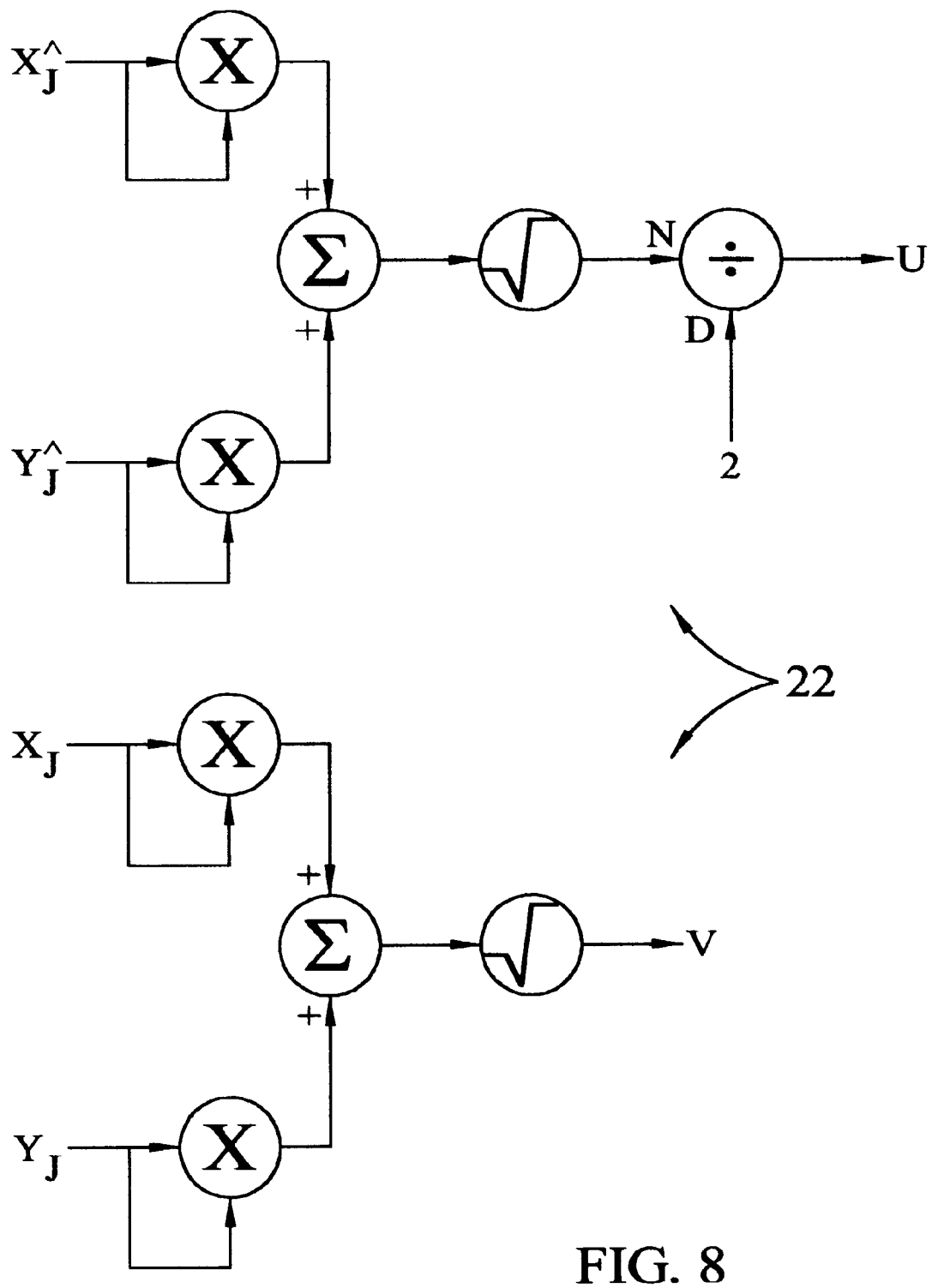
FIG. 8 is a unit energy combiner as may be utilized in the invention.

The unit energy combiner 22 shown in FIG. 1 is shown in detail in FIG. 8. Referring to FIG. 8, unit energy combiner 22 forms $$(x_j, y_j)u + (x_j, y_j)v$$ for positive numbers u and v. For this invention a recommended choice for u and v is u=square root $[x_j^{\wedge 2} + y_j^{\wedge 2}]/2$ and v=square root $[x_j^2 + y_j^2]$.

The adaptive processor integrator of the invention will now be described as utilized with a small signal test that ascertains whether the invention has an affect on an input signal. If no such affect is realized, then one can circumvent the invention and utilize a bleed-through path that goes directly from the radio receiver to its demodulator.

Figure 9:
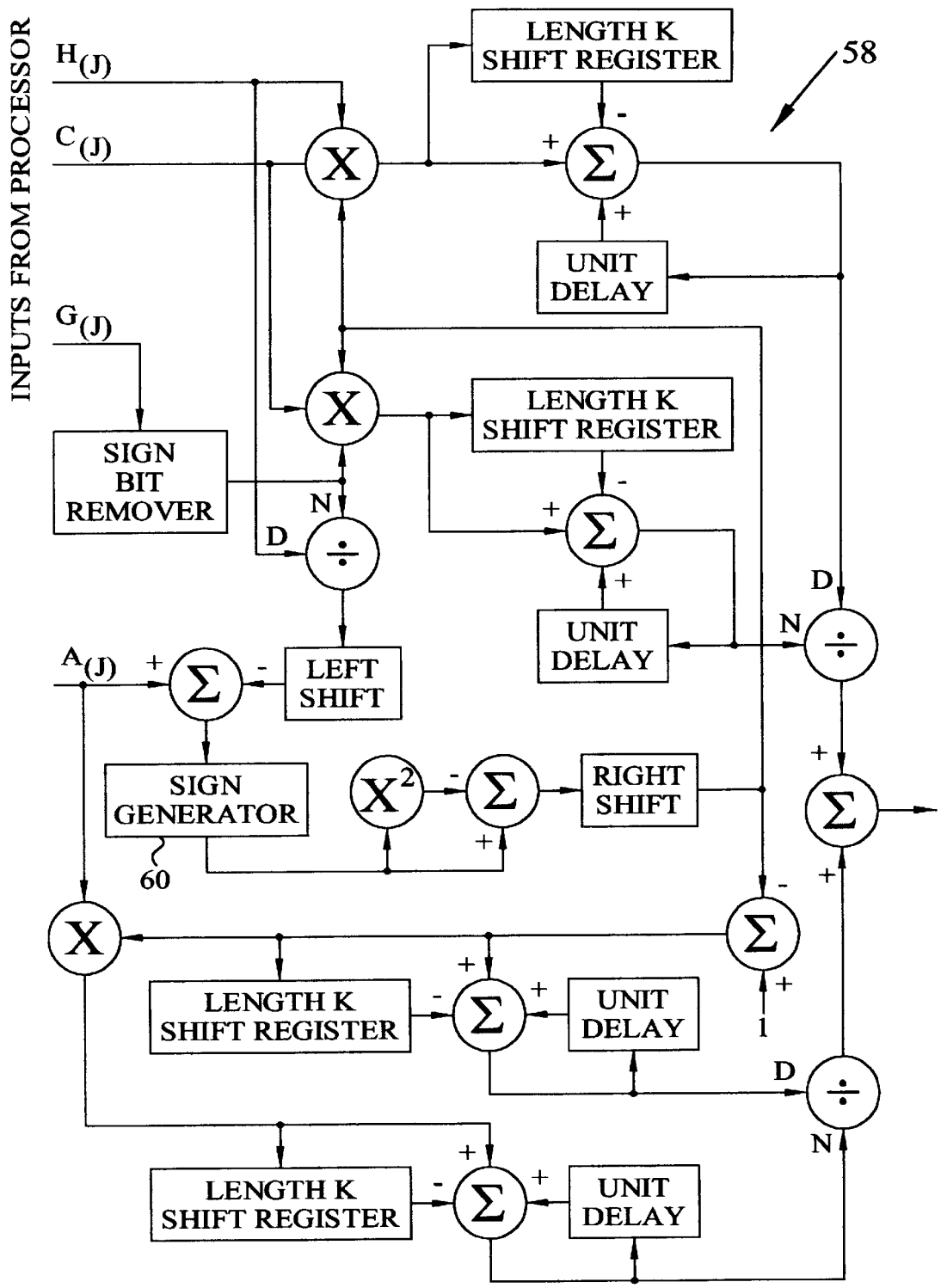
FIG. 9 is a block diagram of the basic index calculator of FIG. 2 with additional circuitry to perform a small signal test.

Referring now to FIGS. 2 and 9, the small signal test is applied to the outputs of processors 1 through M (32) of FIG. 2. To apply such a test, a compensating delay followed by a vector multiplier must be added in order to average the signal magnitudes to obtain reliable signal magnitude estimates. This is done between each processor k (32) and its corresponding delay k (35), the values of delays 1 through M and 1' through M' must be changed appropriately and more complicated index calculators such as that illustrated in FIG. 9 are required.

Amplitude $A_j$ is input to each such index calculator. This input is available from within processor 1 of FIG. 2. For this alternative, $A_j$ from processor 1 would need to be provided to each index calculators k (34), k=1, ..., M. Alternatively, processors 1 through M could be designed to individually output $A_j$ and this could be provided to each processor's corresponding index calculator.

FIG. 9 shows a modified index calculator 58 having circuitry to permit the small signal test. The sign of $A_j - 2(g(j)/h(j))$ is used to decide whether the term g(j) or the term $A_j$ contributes to the index. The sign $e(j) = +1$ or $-1$ is provided by the sign generator 60 shown in FIG. 9 and then the quantity $f(j) = (e(j)^2 + e(j))/2$ is generated. The quantity $f(j) = 0$ when $e(j)$ is negative and is 1 otherwise. When $A_j - 2(g(j)/h(j)) < 0$, the small signal hypothesis fails, so the term involving g(j) is zeroed through multiplication by f(j) in the h(j) and g(j) accumulate paths. $A_j$ is included by multiplication by $(1-f(j))$ in A(j) and its denominator paths.

Index calculator 58 generates the index $$I_k^{\wedge}(j) = \left( \sum_{n=0}^{K-1} f_k(j) c_k(j-n) |g_k(j-n)| \right) /$$

$$\left( \sum_{n=0}^{K-1} f_k(j) h_k(j-n) c_k(j-n) \right) +$$

$$\left( \sum_{n=0}^{K-1} (1 - f_k(j-n)) A_{j-n} \right) / \left( \sum_{n=0}^{K-1} 1 - f_k(j-n) \right)$$

for the k-th processor.

The output $f_k(j)$ multiplies the output $(x_j, y_j)_k$ of processor k so that the input $f_k(j)(x_j, y_j)_k$ to the utilized amplitude and phase output selector is zero whenever the small signal test fails.

In an alternative embodiment of the invention, the amount of hardware used for the processors integrated by the invention can sometimes be reduced by sharing hardware. This alternative applies to adaptive processors with the general structure shown in FIG. 10.

Figure 10:
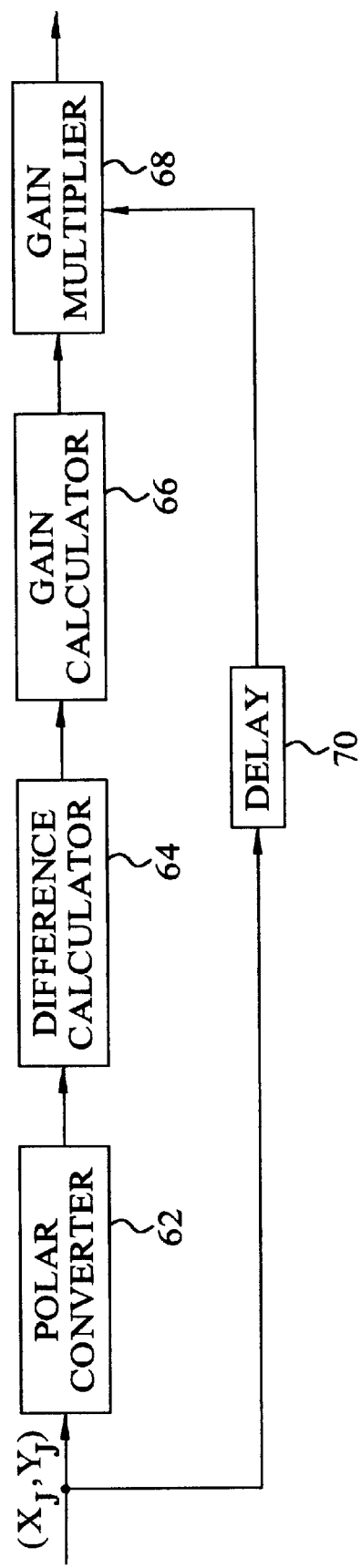
FIG. 10 illustrates in block diagram for a general adaptive processor.

Referring now to FIG. 10, in such a typical processor the output of polar converter 62 is either $A_j$ or $\phi_j$ from which $Z_j$, one of the quantities of amplitude, amplitude-difference, symmetric amplitude-difference, phase, phase-difference, or symmetric phase-difference, is formed within a Difference Calculator 64. The difference calculator forms $Z_j = X_j - X_{j+n}$, $(X_j - X_{j-1}) - (X_{j+n} - X_{j+n-1})$, or $(X_j - (\frac{1}{2}(X_{j-1} + X_{j+1})) - (X_{j+n} - (\frac{1}{2}(X_{j+n-1} + X_{j+n+1}))$, where $X_{j+n} = A_{j+n}$ or $\phi_{j+n}$ for n=j-N, ..., j+N. Gain Calculator 66 shown in FIG. 10 calculates a gain $g_k(j)$ from $$Z_{j-N}, \ldots, Z_{j-1}, Z_j, Z_{j+1}, \ldots, Z_{j+N}.$$

The processor output, $(x_j, y_j)_k$, $= g_k(j) \, (x_j/A_j, y_j/A_j)$ (when $Z_j$ involves an amplitude quantity) and $= g_k(j) \, (-y_j, x_j)$ (when $Z_j$ involves a phase quantity)

is generated using the gain multiplier 68 show in FIG. 10. Delay 70 is used to delay the input of $(x_j, y_j)$ into gain multiplier 68 in order to compensate for the processing time associated with polar convertor 62, difference calculator 64, and gain calculator 66.

Figure 11:
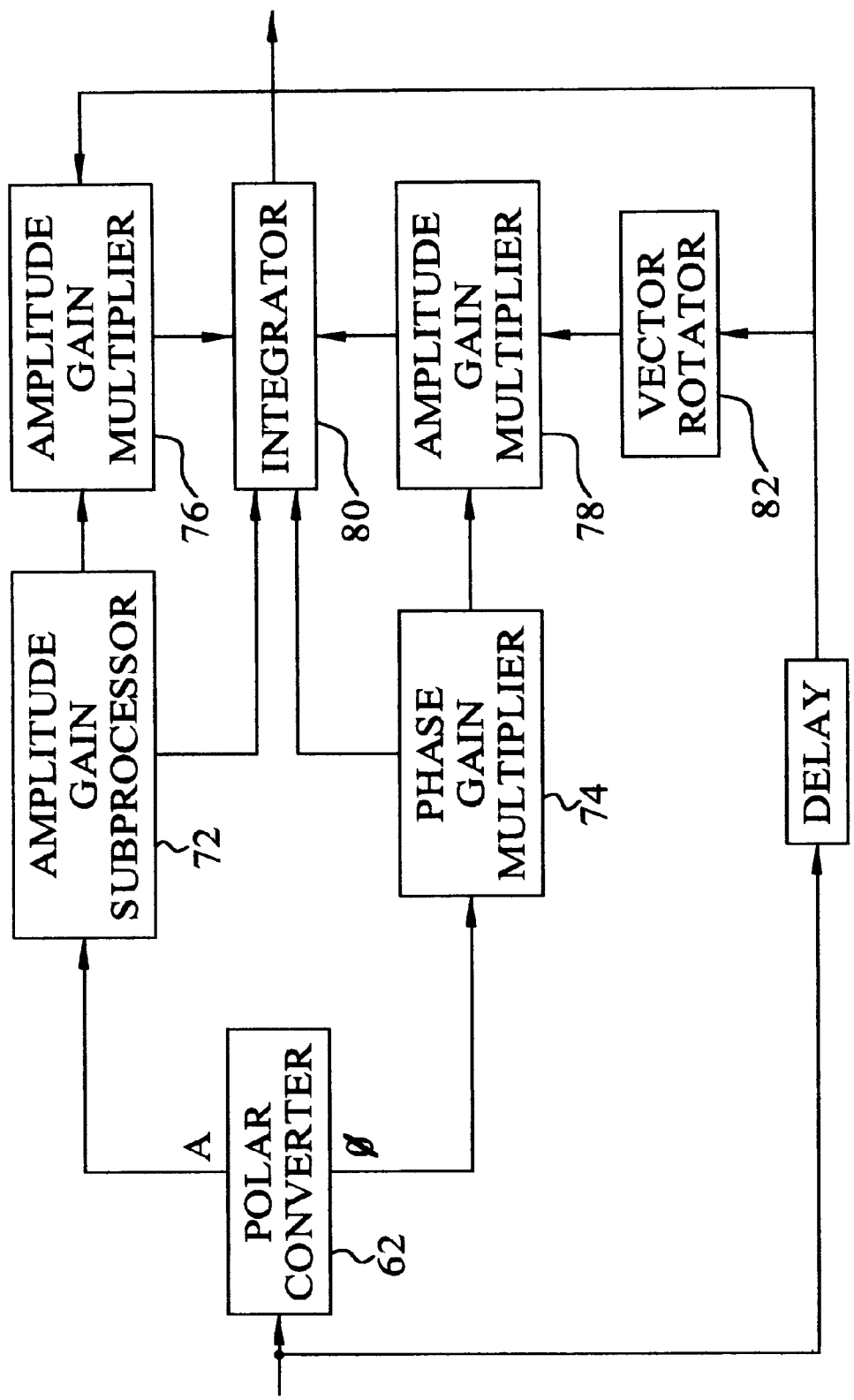
FIG. 11 is a block diagram of an alternative processor integrator according to the invention.
Figure 12:
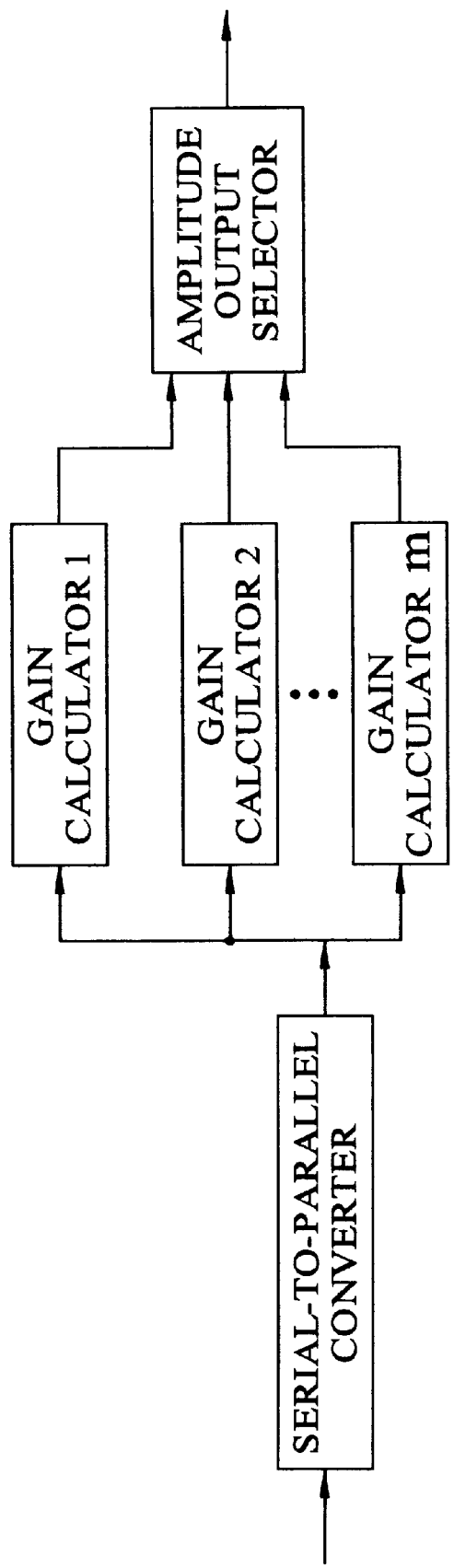
FIG. 12 is a block diagram of an amplitude/phase gain subprocessor as may be utilized with the alternative of the invention illustrated in FIG. 11.

A processor integrator suitable for use in such a shared hardware alternative is shown FIG. 11. This alternative includes amplitude and phase gain subprocessors 72 and 74, respectively. Subprocessors 72 and 74 have the structure shown in FIG. 12 to allow sharing of hardware. The difference calculators and gain calculators used in such subprocessors can be the same as those used in the individual processors (32) of FIG. 2. The Index calculators utilized in such subprocessors are the same as those described earlier. The amplitude (gain) output selector shown in FIG. 12 uses the indexes $I_k$ or $I_k^{\wedge}$ to identify the best processor output. This is accomplished as described earlier herein, with the exception that the inputs $(x_j, y_j)_k$ to the amplitude output selector 50 and phase output selector 52 shown in FIGS. 4A and 4B, respectively, are replaced by inputs $g_k(j)$ and the output $(x_j, y_j)_A$ or $(x_j, y_j)_\phi$ are replaced by $g_A(j)$ or $g_\phi(j)$ and the 1 ... m amplitude gain multipliers in amplitude output selector 50 of FIG. 2 or m+1 ... M phase gain multipliers in phase output selector 52 of FIG. 2 are replaced by a single amplitude gain and a single phase gain multiplier. This allows the use of a single amplitude gain multiplier 76 to be shared among the 1 ... m amplitude processors and a single phase gain multiplier 78 to be shared among the m+1 ... M phase processors.

Integrator 80 shown in FIG. 11 is the same as the amplitude and phase outputs integrator shown in FIG. 7. Vector rotator 82 forms $(-y_j, x_j)$ from $(x_j, y_j)$.

A further alternative of the invention includes a selector and integrator having unnormalized gain processors. This alternative of the invention applies to a further change of the processing when the M processors contain adaptive processors with the general structure shown FIG. 10 for which the gain g(j) is of the form $$g(j) = d(j) \, (\Sigma Z_{j+n} w(j,n))/(\Sigma w(j,n))$$

where the sums are either from −N through N, n≠0, or n=1 to N and the weights w(j,n) are calculated from the samples $X_{j-N}, \ldots, X_{j+N}$. For processor k of this type, the alternative is obtained by having the processor k output the following quantities to the Index calculator k $$g_k(j) = \Sigma Z_{j+n} w(j,n),$$

$$h_k(j) = \Sigma w(j,n)$$

$$c_k(j) = d(j),$$

where $h_k(j)$ and $c_k(j)$ are used as described in the invention to obtain the index $I_k$. This alternative to the invention uses the integrator structure of FIG. 7 to change the sample-to-sample weighing of the outputs of processor k.

If $d(j)=1$ for all j for a processor k, and further the weights $w(j,n)$ involve the calculation of the standard deviation $\delta(j)$ of the quantities $W_{j+n}$ with $Z_{j+n}=W_j-W_{j+n}$, then $$g_k(j) = \Sigma Z_{j+n} w(j,n),$$

$$h_k(j) = \Sigma w(j,n)$$

$$c_k(j) = 1/\delta(j)^2$$

is another way to change the sample-to-sample weighing of processor k.

The invention can also include an adaptive Wiener filter in the bleed-through path 18 shown in FIG. 1. The delay or delays in the invention would need to be changed to adjust the timing to compensate for the increased processing delay caused by the adaptive Wiener filter.

In summary, the M processors integrated in the invention implement adaptive locally optimum processing techniques. These techniques are known to include the best way to detect a communication signal in the presence of non-Gaussian noise. When adaptive locally optimum principles are used to design a practical processor for a military radio, the detailed design of the best processor to be used will depend on the specific nature of the interference anticipated.

This invention describes an efficient method to combine a number of different processors that are individually designed for a number of different types of interference. The invention uses the outputs of the processors incorporated in it to achieve performance equal to the best performing processor incorporated in it. It has the capability of outperforming the best of the incorporated processors by changing the sample-to-sample weighing of the processor outputs, or by switching in real time from using one incorporated processor output to using another incorporated processor output. This invention provides a processor which provides performance similar to that of the optimum processor for a particular interference environment yet is applicable to a greater variety of interferers than any previous single processor.

The invention uses simple modular hardware components which can be easily manufactured. The invention can run at the same speed as the individual processors incorporated into it, with a small additional delay over the largest of the processing delays of any of the individual processors incorporated.

Obviously, many modifications and variations of this invention are possible in light of the above teachings. It is therefore to be understood that within the scope of the appended claims the invention may be practiced other than as has been specifically described.

What is claimed is:

1. A method comprising the steps of:

receiving a signal including interference;

sampling said signal to get a sequence of signal samples;

converting each said signal sample into in-phase and quadrature components;

determining for each said signal sample which of a selected number of amplitude processors and a selected number of phase processors accomplishes the greatest degree of interference suppression, said selected number of amplitude processors and said selected number of phase processors each providing a processed in-phase and quadrature component output; and providing as an input to a demodulator the processed in-phase and quadrature component output of the processor determined to provide the greatest degree of interference suppression.

2. The method of claim 1 in which said signal is a radio frequency signal.

3. The method of claim 1 in which said selected number of amplitude processors includes a processor that filters based upon amplitude, a processor that filters based upon amplitude-difference and a processor that filters based upon symmetric amplitude-difference and in which said selected number of phase processors includes a processor that filters based upon phase, a processor that filters based upon phase differences and a processor that filters based upon symmetric phase-difference.

4. The method of claim 3 in which said signal is a radio frequency signal.

5. A method comprising the steps of:

receiving a signal including interference;

sampling said signal to get a sequence of signal samples;

converting each of said signal samples into in-phase and quadrature components;

processing said in-phase and quadrature components in a plurality of amplitude and phase processors, said plurality of amplitude processors including a processor that filters based upon amplitude, a processor that filters based upon amplitude-difference and a processor that filters based upon symmetric amplitude-difference, said plurality of phase processors including a processor that filters based upon phase, a processor that filters based upon phase-difference and a processor that filters based upon symmetric phase-difference, in which each of said amplitude and phase processors provides a processed in-phase and quadrature component output and at least one filter factor;

computing a processor performance index for each of said amplitude and phase processors, each said processor performance index being a measure of its respective processor's interference suppression performance and being based upon a combination of said respective processor's processed in-phase and quadrature component output and said respective processor's at least one filter factor;

determining for each said signal sample which of said amplitude processors and said phase processors has the performance index representing the greatest degree of interference suppression among said processors; and providing as an input to a demodulator the processed in-phase and quadrature output of the processor whose performance index indicates the greatest degree of interference suppression.

6. The method of claim 5 in which said signal is a radio frequency signal.

7. A method comprising the steps of:

receiving a signal including interference;

sampling said signal to get a sequence of signal samples;

converting each of said signal samples into in-phase and quadrature components;

processing said in-phase and quadrature components in a plurality of amplitude and phase processors, said plurality of amplitude processors including a processor that filters based upon amplitude, a processor that filters based upon amplitude-difference and a processor that filters based upon symmetric amplitude-difference, said plurality of phase processors including a processor that filters based upon phase, a processor that filters based upon phase-difference and a processor that filters based upon symmetric phase-difference, in which each of said amplitude and phase processors provides a processed in-phase and quadrature component output and at least one filter factor;

computing a processor performance index for each of said amplitude and phase processors, each said processor performance index being a measure of its respective processor's interference suppression performance and being based upon a combination of said respective processor's processed in-phase and quadrature component output and said respective processor's at least one filter factor;

determining for each said signal sample which of said amplitude processors has the performance index representing the greatest degree of interference suppression among said amplitude processors and determining for each said signal sample which of said phase processors has the performance index representing the greatest degree of interference suppression among said phase processors; and providing as an input to a demodulator the processed in-phase and quadrature output of the processor among said amplitude and phase processors whose performance index indicates the greatest degree of interference suppression.

8. The method of claim 7 in which said signal is a radio frequency signal.

9. The method according to claim 7 in which the processed in-phase and quadrature output of the amplitude processor having the performance index indicating the greatest degree of interference suppression among said amplitude processors and the processed in-phase and quadrature output of the phase processor having the performance index indicating the greatest degree of interference suppression among said phase processors are both provided as an input to said demodulator.

10. The method of claim 9 in which said signal is a radio frequency signal.

\* \* \* \* \*